Patented Jan. 26, 1926.

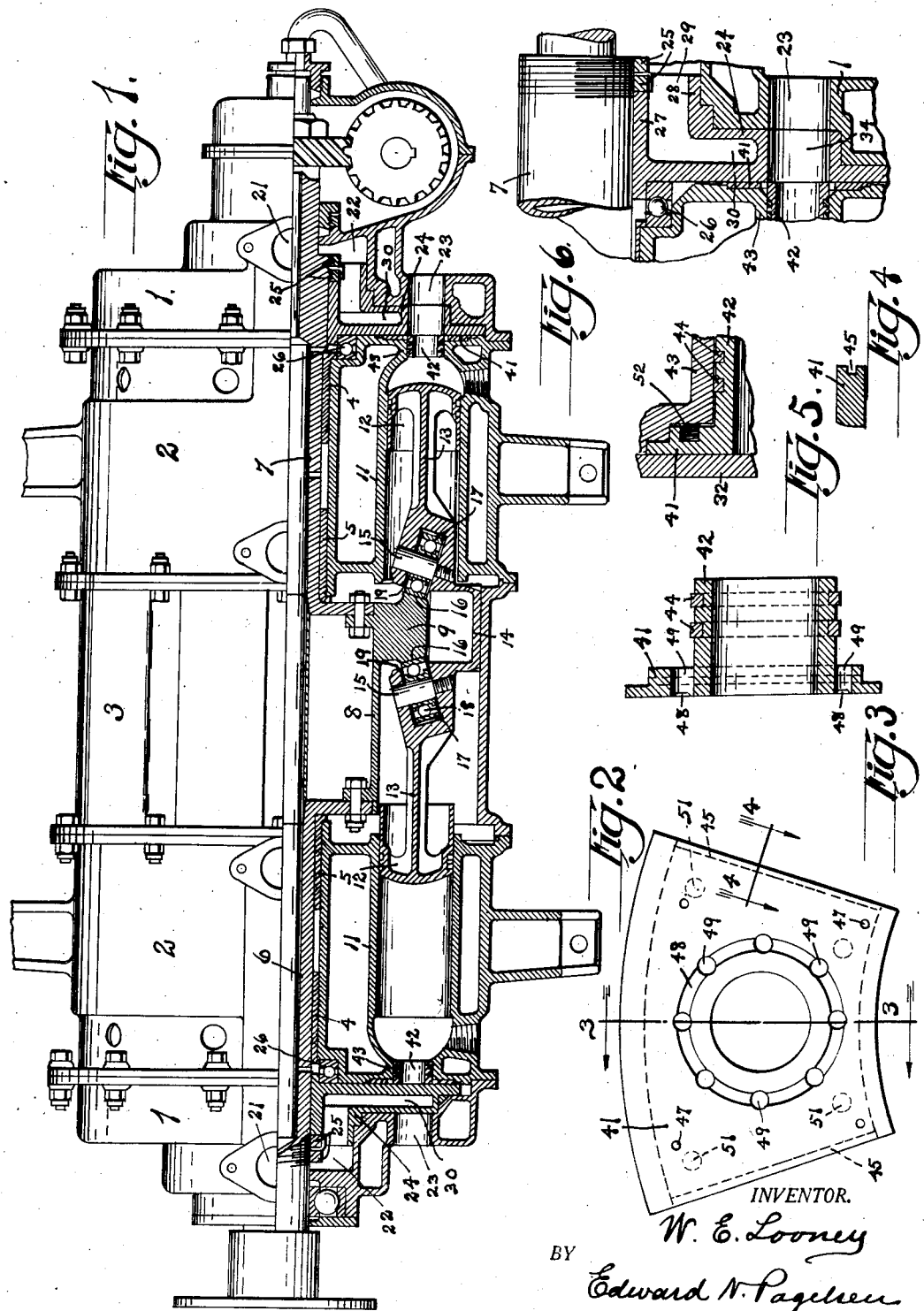

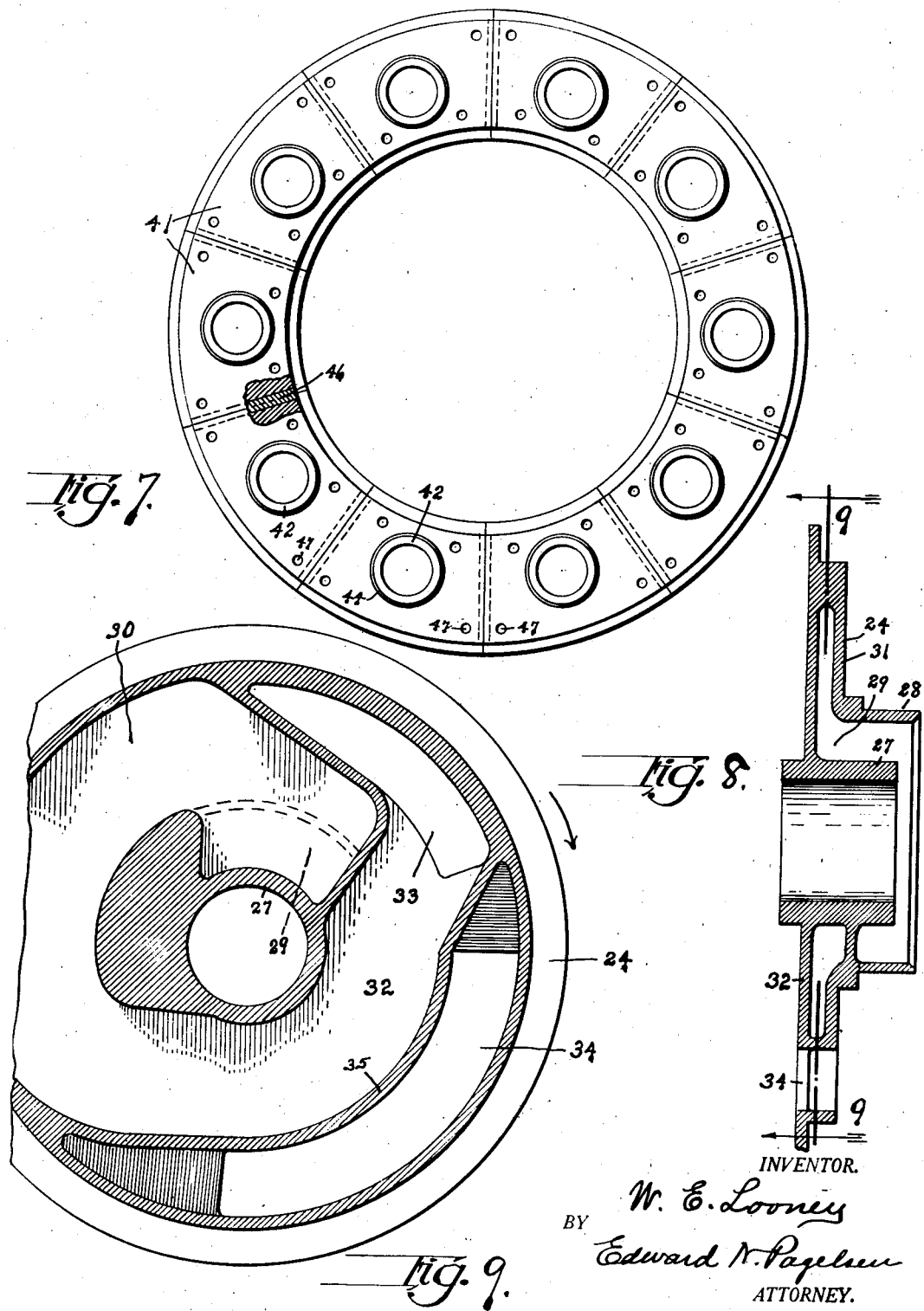

1,570,902

UNITED STATES PATENT OFFICE.

WILLIAM E. LOONEY, OF DETROIT, MICHIGAN.

ENGINE.

Application filed February 15, 1922. Serial No. 536,631.

*To all whom it may concern:*

Be it known that I, WILLIAM E. LOONEY, a citizen of the United States, and residing at Detroit, in the county of Wayne and State of Michigan, have invented a new and Improved Engine, of which the following is a specification.

This invention relates to internal combustion engines of the type shown in my former Patent No. 1,345,940, dated July 6, 1920, wherein the force of the explosion is transmitted through a continuous cam from a series of pairs of oppositely arranged cylinders and pistons to an engine shaft, and its object is to provide a connection between the cam and the piston rods which will produce a minimum of lateral outward thrust on the piston rods, and to provide novel packing members between the rotatable valves and the ends of the cylinders which will cause minimum friction drag on the valves.

In the drawings, Fig. 1 is a view, partly in elevation and partly in central section of this improved engine. Fig. 2 is an outside elevation of a packing member for preventing excess leakage between the rotating valves and the ends of the cylinders. Figs. 3 and 4 are sections on the lines 3—3 and 4—4 respectively of Fig. 2. Fig. 5 is a section similar to Fig. 2 showing a positioning spring. Fig. 6 is an enlarged detail of Fig. 1. Fig. 7 is an inner elevation of these packing members grouped in the engine. Fig. 8 is a longitudinal section of a valve ring. Fig. 9 is a section on the line 9—9 of Fig. 8.

Similar reference characters refer to like parts throughout the several views.

As shown and described in detail in my former patent, this engine is provided with ends or heads 1, cylinder blocks 2, and a central drum 3 which embodies the cross head guides. Rotatable in the bearings 4 and 5 is a shaft built up of two parts 6 and 7 which are connected by the central cam carrier 8 on which is formed a cam 9 which extends from end to end of the carrier 8 once for each ninety degrees of the circumference of the cam carrier and may be said to have a continuous double V or wave configuration, the main portion of which are at an angle of substantially forty-five degrees to the axis of the shaft.

Each cylinder block includes a series of cylinders 11, ten being shown although the number may vary, and the cylinders of one block are alined with those of the other. Reciprocating in the cylinders are the pistons 12 that are joined by the piston rods 13 and the cross heads 14, each cross head constituting a shoe that slides in a corresponding guide in the central drum 3.

At the point of connection between each piston rod and its cross head are mounted the pins 15 which are parallel to the bearing faces 16 of the cam 9 when the pistons are at the ends of their strokes, and on these pins are bearing rollers 17, preferably provided with bearing balls 18, the adjacent portions of the connecting rods being formed with slots 19 to receive these rollers. The purpose and effect of this contact of a cylindrical roller with the beveled face of the cam 9 is to tend to force the cross head 14 away from the shaft, but this pressure is light and unobjectionable and has the advantage of preventing the piston rods being drawn toward the shaft, which might result in a binding action between the bearing rollers and the cam.

The advantage of having a bearing roller at the particular angle and of the particular construction shown in the drawing lies in the fact that it can run at very high speed without binding and requires no thrust washers to limit the movements of the balls and it thus reduces the load on the bearing balls. It will be understood that any number of rings or bearing balls may be employed between the bearing rollers and the inner bearing rings.

As in the engine shown in my patent, the fuel is received at each end of the engine through the ports 21 which connect circumferential passages 22. The heads 1 are formed with exhaust passages 23, one for each cylinder and in alinement therewith. Attached to the main shaft at each end of the engine is a control valve 24, held in position on the shaft by the nuts 25 and bearing against the roller bearing 26 carried by the cylinder block 2. These valves are duplicates of each other, excepting that one is right and the other left handed.

Each valve has a central hub 27 fitting the main shaft and a concentric hub 28 fitting the cylinder head. The passage 29 between these hubs connects the passage 22 to the interior chamber 30 of the valve. This chamber is provided with an outer side 31 and an inner side 32 which has an opening 33 which constitutes the intake port of the several cylinders controlled by the valve. The exhaust passage 34 extends entirely through the valve. I have formed the inner chamber 30 in the manner shown, extending from the intake opening 29 to the port opening 33 so that the fuel will sweep around the opposite direction to the rotation of the valve which causes free movement of the fuel and assists in cooling the hot inner face of the valve.

The rear end of the port opening 33 is tapered in order to prevent condensation of the fuel when its flow to the cylinder is stopped. The tapering opening causes the fuel to slow down gradually instead of stopping it suddenly. The tapering pockets at the ends of the exhaust port 34 have no effect on the action of the exhaust, but they serve to produce a stream-line effect of the partition wall 35 and thereby eliminate the pocketing of the fuel which would otherwise accumulate and condense.

In order to form a tight joint between the ends of the cylinders 11 and the adjacent valve 24, the packing member shown in Figs. 2, 3 and 7 may be used, one of these members being used for each cylinder. Each packing member consists of a plate 41 and a cylindrical thimble 42 adapted to enter the reduced outer end 43 of the cylinder, the thimble being provided with packing rings 44 if desired. The plates 41 constitute a complete ring when the packing members are all in position, and I prefer to form their adjacent edges with grooves 45 (Fig. 4) to receive keys 46 (Fig. 7) which prevent leakage of gases between adjacent plates.

I have shown the plates 41 formed with small holes 47 which are adapted to receive and hold lubricant, but these holes may be omitted if desired. A groove 48 may be formed in the faces of the plates 41 next to the main valve and holes 49 extend through this plate. It has been found that a certain amount of fuel vapor or gas is practically always present between the plates 41 and the rotating valve and the pressure of this fuel at any plate is substantially that of the fuel in the cylinder adjacent this plate. These holes 49 prevent the escape of this pressure between the valve and the packing members and the grooves 48 reduce the area under this pressure. Recesses 51 may be formed in the sides of the plates 41 facing the cylinders and springs 52 in these recesses are adapted to hold the plates 41 against the main valve and prevent leakage. It will be understood that the grooves in the plates 41 may be omitted and corresponding grooves formed in the face of the valve next to the plates in order to furnish passages for the escape of the gases, or the grooves may be formed in both the plates and the valve for this purpose.

The details of construction and the proportion of the parts of this engine may all be changed by those skilled in the art without departing from the spirit of my invention as set forth in the following claims.

I claim:—

1. In an engine comprising a cylinder and a head for one end thereof, a combined intake and exhaust valve mounted to slide between the end of the cylinder and the cylinder head, a packing member comprising a plate adapted to bear against the valve, and a thimble extending into the adjacent end of the cylinder, said packing member having holes through said plate adjacent the outer surface of the thimble to permit the passage of gases.

2. An internal combustion engine comprising parallel cylinders having a common head, a combined intake and exhaust valve for the cylinders slidable between the ends of the cylinders and the cylinder head, a packing member for each cylinder comprising a plate adapted to bear against the valve, and a thimble extending into the adjacent end of the cylinder, said plates constituting a complete ring between the ends of the cylinders and said valve and being provided with radial slots in their adjacent edges to receive keys whereby leakage between them may be prevented.

3. In an engine comprising a cylinder and a head for one end thereof, a combined intake and exhaust valve mounted to slide between the end of the cylinder and the cylinder head, a packing member comprising a plate adapted to bear against the valve, and a thimble extending into the adjacent end of the cylinder, said packing member having holes through said plate adjacent the outer surface of the thimble to permit the passage of gases, the face of the plate next the valve being formed with grooves to receive gases and allow their escape through said holes and to balance the pressures on opposite ends of the thimble, and springs to hold said plate against the valve.

WILLIAM E. LOONEY.